United States Patent
Fu et al.

(10) Patent No.: US 7,155,807 B2
(45) Date of Patent: Jan. 2, 2007

(54) METHOD OF CENTERING MEDIA DISKS ON THE HUB OF A SPINDLE MOTOR IN A HARD DISK DRIVE

(75) Inventors: Ta-Chang Fu, San Jose, CA (US); Robert A. Lenicheck, Palo Alto, CA (US); Sattar Malek, San Jose, CA (US); Kim Ungtae, San Jose, CA (US); Stanley Yen Wong, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 137 days.

(21) Appl. No.: 10/651,263

(22) Filed: Aug. 28, 2003

(65) Prior Publication Data
US 2005/0044694 A1    Mar. 3, 2005

(51) Int. Cl.
*G11B 5/127* (2006.01)
*H04R 31/00* (2006.01)

(52) U.S. Cl. .............................. 29/603.04; 29/603.03; 29/603.05; 310/51; 310/67 R; 310/91; 360/98.07; 360/99.05; 360/99.08; 360/97.01; 360/97.04

(58) Field of Classification Search ............................. 29/603.03–603.06; 360/98.07, 99.04, 97.01–97.04, 360/99.05–99.12, 99.08; 310/51, 67 R, 91
See application file for complete search history.

(56) References Cited

U.S. PATENT DOCUMENTS

| | | | | |
|---|---|---|---|---|
| 4,780,777 A | * | 10/1988 | Biermeier et al. | 360/98.07 |
| 5,422,776 A | * | 6/1995 | Thorson et al. | 360/98.07 |
| 5,731,928 A | * | 3/1998 | Jabbari et al. | 360/98.08 |
| 5,770,002 A | * | 6/1998 | Funawatari et al. | 156/379.6 |
| 5,859,745 A | | 1/1999 | Elsing et al. | |
| 5,942,820 A | | 8/1999 | Yoshida | |
| 6,041,488 A | * | 3/2000 | Wang | 29/603.03 |

FOREIGN PATENT DOCUMENTS

EP    0348846 A2 *    6/1989

OTHER PUBLICATIONS

"A continuous-time area detector servo demodulator for hard disk drives"; Garrido, N.de F.; Franca, J.E.; Electronics, Circuits and Systems, 1998 IEEE International Conference Sep. 7-10, 1998 pp. 127-130.*

* cited by examiner

*Primary Examiner*—Paul D. Kim
(74) *Attorney, Agent, or Firm*—Bracewell & Giuliani LLP

(57) ABSTRACT

A method for centering and securing data storage disks to the hub of a spindle motor in a hard disk drive has a chamfer and a countersink on the top of the spindle motor shaft center. During the hard disk drive assembly process, a disk centering tool engages and uses these features to locate and center the disks that are installed on the spindle motor. The features are closely toleranced to provide a very precise centering feature for mounting and aligning the media disks with respect to the hub and the spindle motor. The present design reduces the complexity of the tooling and fixtures required to complete the assembly. As a result, the overall part cost is reduced and the manufacturing yield is improved.

2 Claims, 2 Drawing Sheets

METHOD OF CENTERING MEDIA DISKS ON THE HUB OF A SPINDLE MOTOR IN A HARD DISK DRIVE

BACKGROUND OF THE INVENTION

1. Technical Field

The present invention relates in general to an improved method for a hard disk drive and, in particular, to an improved method for centering and attaching media disks to the hub of a spindle motor in a hard disk drive.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the data storage disks to the hub of the spindle motor is typically accomplished via a disk clamp. The disk clamp retains the disks on the hub by attaching directly to the hub of the motor. It is very important to precisely center the disks to the hub in order to reduce installation-induced mass imbalance. Any imbalance in the disk pack and motor assembly is readily apparent when the assembly is rotated at operational speeds, which may range from 10,000 to 15,000 rpm. Thus, the reduction of imbalance prior to the balancing process can significantly improve the manufacturing process.

A conventional disk clamp 11 (FIG. 1) is typically centered on the spindle motor 13 by providing a rib 15 on top of the spindle motor hub 17. The rib 15 protrudes upward from the hub 17 and has an outer diameter 19 on which an inner diameter 21 of the disk clamp 11 is positioned and thereby centered. Moreover, very precise and expensive tooling is required to properly center and align the disk clamp 11 and hub 17. Although this design is workable, an improved method for attaching and centering a disk clamp on the hub of a spindle motor in a hard disk drive would be desirable.

SUMMARY OF THE INVENTION

One embodiment of a method for securing data storage disks to the hub of a spindle motor in a hard disk drive has a precision-tooled chamfer and a countersink on the top of the spindle motor shaft center. During the hard disk drive assembly process, a disk centering tool engages and uses these features to precisely locate and center the disks that are installed on the spindle motor. The features are closely toleranced to provide a very precise centering feature for mounting and aligning the media disks with respect to the hub and the spindle motor. The present design reduces the complexity of the tooling and fixtures required to complete the assembly. As a result, the overall part cost is reduced and the manufacturing yield is improved.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
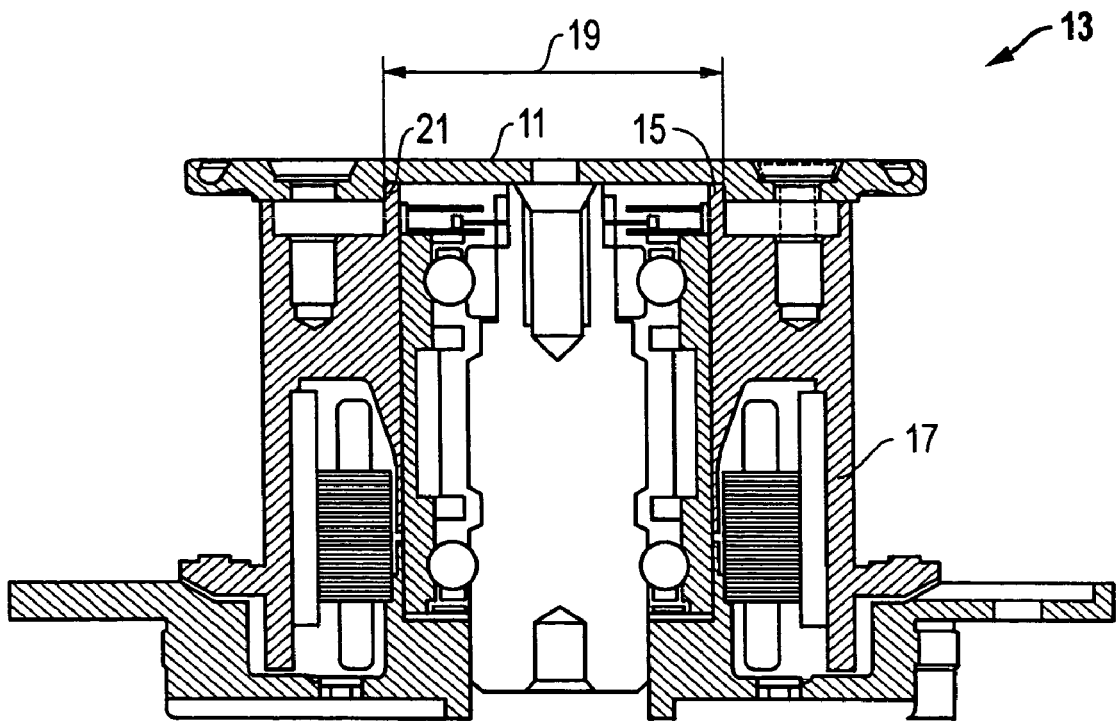
FIG. 1 is a sectional side view of a prior art disk clamp and hub assembly.
Figure 2:
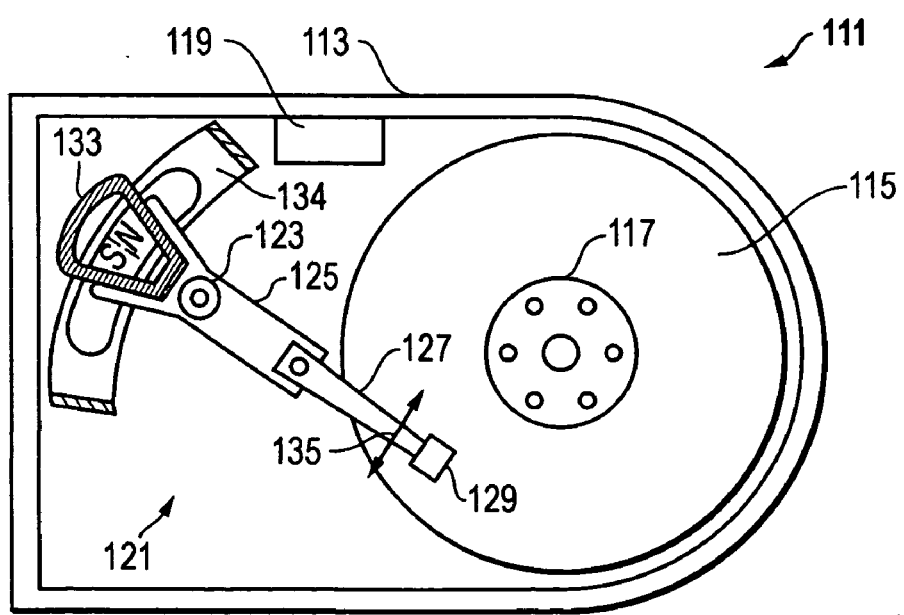
FIG. 2 is a simplified plan view of one embodiment of a hard disk drive constructed in accordance with the present invention.

Referring to FIG. 2, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 3:
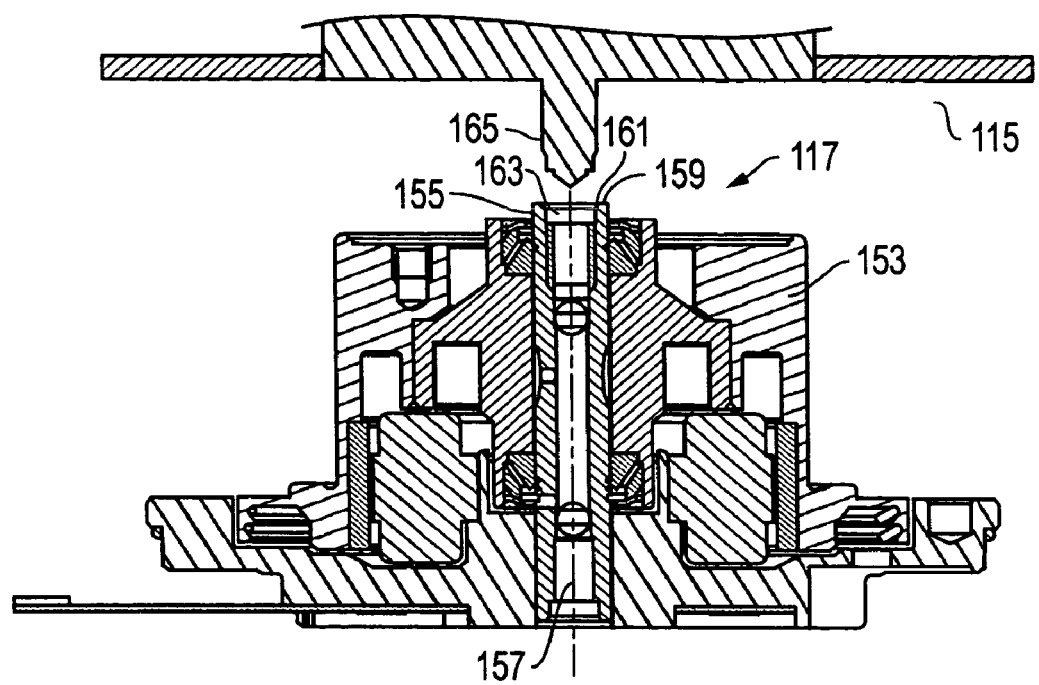
FIG. 3 is a sectional side view of one embodiment of a spindle motor design for the hard disk drive of FIG. 2 and is constructed in accordance with the present invention.

Referring now to FIG. 3, one embodiment of a method for axially centering, concentrically aligning, and attaching one or more media disks 115 to a hub assembly 117 of a motor in the hard disk drive 111 is shown. Some of the elements of the motor are not illustrated for ease of understanding. In the embodiment shown, the hub assembly 117 comprises a rotatable hub 153 and a stationary shaft 155 that is fixed relative to the hub 153. The motor is mounted to the enclosure 113 (FIG. 2) and has an axis 157 (FIG. 3).

The hub 153 is rotatable about the axis 157 relative to the enclosure 113 and the shaft 155. The hub 153 has an axial end 159 with an axial feature formed in the axial end 159. In the embodiment shown, the axial feature comprises a chamfer 161 and a countersink 163 that are concentrically aligned with the axis 157. The chamfer 161 and countersink 163 may comprise many different forms other than those shown as is commonly known in the art. The chamfer 161 is located at a distal end of the axial end 159, and the countersink 163 is located axially inward of the chamfer 161. As will be described below, a guide member 165 is used to concentrically align the disk 115 with respect to the axial feature to reduce any initial imbalance therein. The guide member 165 may be configured to precisely complement the shape of the axial feature, or otherwise require precise registration and alignment with the axial feature.

In operation, the present invention comprises a method of concentrically aligning and attaching the disk 115 to the hard disk drive 111. The method comprises providing the hub assembly 117 with an axis 157 of rotation and an axial end 159. Another step requires forming the axial feature (such as chamfer 161 and countersink 163) in the axial end 159 that is concentrically aligned with the axis 157 of rotation. An additional step requires bringing the guide member 165 into proximity and contact with the axial feature in the hub assembly 117 such that the guide member 165 is concentrically aligned with the hub assembly 117 with respect to the axis 157 of rotation. Concentrically aligning the disk 115 with the hub assembly 117 based on the alignment between the guide member 165 and the axial feature of the previous step is also required. Finally, the step of mounting the disk 115 to the hub assembly 117 to form a disk pack assembly is performed.

As stated previously, the axial feature may comprise forming a chamfer 161 and a countersink 163 in the axial end 159. Similarly, the method may comprise providing the hub assembly 117 with a shaft 155 in which the axial feature is formed, and rotating the hub assembly 117 relative to the shaft 155.

Figure 4:
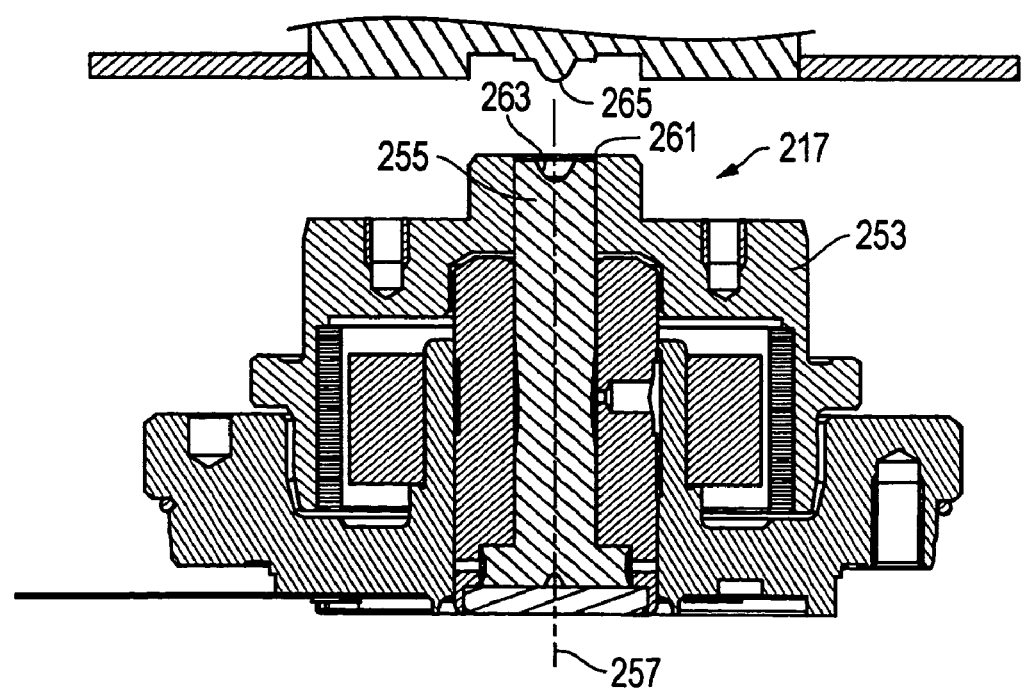
FIG. 4 is a sectional side view of another embodiment of a spindle motor design for the hard disk drive of FIG. 2 and is constructed in accordance with the present invention.

An alternate embodiment of the present invention is shown in FIG. 4 as a hub assembly 217 having an axis 257 and a shaft 255 that rotates with the hub 253. The axial feature in shaft 255 differs from the previous embodiment, in that it is axially shallower and radially narrower. However, the axial feature in shaft 255 may comprise a chamfer 261 and a countersink 263 for axially centering, concentrically aligning, and attaching a guide member 265 and one or more media disks as described above. Other than the configuration of the axial features in the shaft 255 and of the guide member 265, and the rotation of the shaft 255 with the hub assembly 217, this embodiment is substantially identical to the first embodiment.

The present invention has several advantages and solves a number of problems over prior art designs by overcoming issues related to axially aligning and centering the disks when they are fastened to the hub of the spindle motor. During the hard disk drive assembly process, the disk centering tool engages and uses the axial features to precisely locate and center the disks that are installed on the spindle motor. The features are closely toleranced to provide a very precise centering feature for mounting and aligning the media disks with respect to the hub and the spindle motor. The present design reduces the complexity of the tooling and fixtures required to complete the assembly. As a result, the overall part cost is reduced and the manufacturing yield is improved.

While the invention has been shown or described in only some of its forms, it should be apparent to those skilled in the art that it is not so limited, but is susceptible to various changes without departing from the scope of the invention.

What is claimed is:

1. A method of concentrically aligning and attaching a disk to a hard disk drive, the method comprising:
   (a) providing a hub assembly with an axis of rotation and an axial end;

(b) forming an axial feature in the axial end that is concentrically aligned with the axis of rotation;

(c) providing a guide member with an outer surface and a protrusion, the protrusion being integrally formed with and extending directly from the guide member;

(d) mounting a disk to the outer surface of the guide member such that the guide member is free of contact with an outer perimeter of the disk;

(e) bringing the protrusion of the guide member into proximity and contact with the axial feature in the hub assembly such that the guide member is concentrically aligned with the hub assembly with respect to the axis of rotation exclusively via the protrusion, the protrusion being inserted into an opening a hub shaft, and the opening being a rounded concave dimple that is complementary in shape to the protrusion;

(f) concentrically aligning the disk with the hub assembly based on the alignment between the guide member and the axial feature in step (e);

(g) transferring the disk from the guide member to the hub assembly such that the disk is mounted to the hub assembly to form a disk pack assembly; and (h) after releasing the protrusion from the hub shaft and the guide member remaining free of contact with the outer perimeter of the disk, enclosing the hard disk drive with a base plate, cover, and seal assembly.

2. A method of concentrically aligning and attaching a disk to a hard disk drive, the method comprising:

(h) providing a hub assembly with a shaft having an axis of rotation and an axial end;

(i) forming a chamfer and a rounded concave countersink in an opening in the axial end of the shaft that are concentrically aligned wit the axis of rotation;

(j) providing a guide member with an outer surface and a protrusion, the protrusion being integrally formed with and extending directly from the guide member and having a rounded convex tip that is complementary in shape to the rounded concave countersink;

(k) mounting a disk to the outer surface of the guide member such that the guide member only contacts an inner diameter of the disk and is free of contact with an outer perimeter of the disk;

(l) bringing the rounded convex tip of the protrusion into proximity and contact with the chamfer and the rounded concave countersink in the hub assembly such that the guide member is concentrically aligned with the hub assembly with respect to the axis of rotation exclusively via the protrusion;

(m) concentrically aligning the disk with the hub assembly based on the alignment between the guide member and the chamfer and the countersink in step (e) while the guide member remains free of contact with the outer perimeter of the disk; then (n) transferring the disk from the guide member to the hub assembly such that the disk is mounted to the hub assembly to form a disk pack assembly; and (o) enclosing the hard disk drive a base plate, cover, and seal assembly.

* * * * *

UNITED STATES PATENT AND TRADEMARK OFFICE
CERTIFICATE OF CORRECTION

PATENT NO. : 7,155,807 B2  Page 1 of 1
APPLICATION NO. : 10/651263
DATED : January 2, 2007
INVENTOR(S) : Ta-Chang Fu et al.

It is certified that error appears in the above-identified patent and that said Letters Patent is hereby corrected as shown below:

Column 5, Line 14: insert --in-- after "opening"
Column 6, Line 3: replace "wit" with --with--

Signed and Sealed this

Twentieth Day of March, 2007

JON W. DUDAS
*Director of the United States Patent and Trademark Office*